United States Patent [19]

Kato

[11] Patent Number: 4,725,087
[45] Date of Patent: Feb. 16, 1988

[54] SPRING-LOADED HAND FOR AN INDUSTRIAL ROBOT

[75] Inventor: Hisao Kato, Aichi, Japan

[73] Assignee: Mitsubishi Denki Kabushiki Kaisha, Tokyo, Japan

[21] Appl. No.: 839,381

[22] Filed: Mar. 14, 1986

[30] Foreign Application Priority Data

Mar. 15, 1985 [JP] Japan ................................. 60-50531

[51] Int. Cl.$^4$ ............................................. B25J 15/00
[52] U.S. Cl. .................................. 294/86.4; 294/87.1; 414/732; 414/736; 414/763; 901/31; 901/49
[58] Field of Search ................ 294/86.4, 88, 106, 902, 294/87.1; 414/729, 732, 733, 736, 738, 763, 783, 917; 901/15, 27–31, 36–39, 45, 48, 49

[56] References Cited

U.S. PATENT DOCUMENTS

| | | | |
|---|---|---|---|
| 1,807,360 | 5/1931 | Wehr | 294/106 |
| 3,289,485 | 12/1966 | Cazalis et al. | 901/49 X |
| 3,652,117 | 3/1972 | Schroder | 294/106 X |
| 4,416,577 | 11/1983 | Inaba et al. | 414/736 X |
| 4,592,697 | 6/1986 | Tuda et al. | 901/48 X |

FOREIGN PATENT DOCUMENTS

| | | | |
|---|---|---|---|
| 114096 | 7/1984 | European Pat. Off. | 294/86.4 |
| 2717221 | 11/1978 | Fed. Rep. of Germany | 901/36 |
| 1068877 | 5/1967 | United Kingdom | 294/86.4 |
| 1000271 | 2/1983 | U.S.S.R. | 901/48 |

Primary Examiner—Johnny D. Cherry
Attorney, Agent, or Firm—Sughrue, Mion, Zinn, Macpeak, and Seas

[57] ABSTRACT

A double-hand apparatus for an industrial robot, in which a first and second hand are mounted on a common frame. Two supporting arms are pivotally supported at respective ends on a pair of rotary shafts on the common frame and at their other ends at two respective points on a base such that the two arms extend parallel to each other so as to constitute a parallel link. At least one of the supporting arms is pressed at one end by an energizing spring. Thereby the two supporting arms in a normal state are held in a predetermined parallel link attitude by the spring force by the energizing spring. When either the first or the second hand receives a reaction force from a workpiece that is being set on a table, this reaction force deforms the parallel link of the supporting arms against the force of the energizing spring to thereby lessen the effect of the reaction force.

13 Claims, 6 Drawing Figures

SPRING-LOADED HAND FOR AN INDUSTRIAL ROBOT

BACKGROUND OF THE INVENTION

This application is related to U.S. patent application Ser. No. 680,725, filed Dec. 12, 1984, now abandoned.

The present invention generally relates to a hand apparatus of an industrial robot. In particular, it relates to an apparatus for effectively causing a floating mechanism including a simple energizing spring to perform any one of a number of gripping functions of double hands.

FIGS. 1 and 2 are diagrams showing the conventional double hands provided with a floating mechanism. Such hands are disclosed, for example, in Japanese Unexamined Utility Model Publication No. 55-66789, and FIG. 1 is a perspective view of such a hand. FIG. 2 is a side view of FIG. 1. As shown in these drawings, a double hand is composed of a pair of grippers 3 and 4 arranged parallel to each other and displaced along the direction of a central axis, as indicated by a single-dot chain line 2. The two grippers 3 and 4 are used for gripping a workpiece. Respective pairs of gripping pawls 5 and 6, provided on the grippers 3 and 4, are arranged to be openable and closable in respective planes that are perpendicular to the central axis 2. The pawls 5 and 6 are actuated through respective link mechanisms 7 and 8. The opening and closing of the gripping pawls 5 and 6 is performed by actuators (not shown) provided in the respective base portions of the grippers 3 and 4. Four floating elements 9 are each composed of an elastic body such as a spring or the like and are placed between the grippers 3 and 4. A joint 10 allows for the rotation of the double hand 1 and is connected through a wrist mechanism 11 to an arm 12. The upper gripper 3 is directly connected to the joint 10 while the lower gripper 4 is connected to the joint 10 through the resilient floating elements 9.

In the described conventional double hand having the floating mechanism, a workpiece 13, indicated by a double-dotted chain line of FIG. 2, is gripped by the lower pair of gripping pawls 6 of the gripper 4 and is then conveyed in the direction of the arrow to be grasped by a chuck of a lathe. The workpiece 13 as a result presses the lathe chuck, and therefore a reaction force is exerted in the chuck. The reaction force, in turn, is exerted onto the floating elements 9 through the lower gripping pawls 6 and weakened by the floating elements 9 so that the reaction force is softened.

Next, when the gripper 4 and the gripping pawls 6 have been cycled through one set of operations including gripping and conveying, the wrist mechanism 11 is rotated by 180° so as to cause the gripping pawls 5 of the gripper 3 to carry out the next operation, which is similar to that carried out in the preceding cycle with the gripper 4. Therefore, in the second operation, the reaction force generated when the workpiece 13 is forced against the chuck is not exerted on the floating elements 9 because the gripper 3 is directly fixed on the joint 10. Accordingly, the gripper 3 is used only for carrying out such a process where no buffer action is required against the reaction force.

In the thus-arranged conventional double-hand apparatus provided with the floating mechanism, there have been problems, specifically, that the apparatus has a complicated mechanism including a plurality of floating elements. Furthermore, the reaction force exerted on a workpiece is absorbed by the floating mechanism, and a vertical force component of this reaction force is produced which makes it difficult to correctly set the workpiece. Also, among the reaction forces exerted onto the hands in different situations, only the reaction force exerted on the hand provided with the buffer mechanism is absorbed.

SUMMARY OF THE INVENTION

An object of the invention is to eliminate the above problems of the prior art.

In particular, an object of the present invention is to provide an apparatus in which it is possible to correctly set a workpiece by means of a simple floating mechanism, even if a reaction force is generated in the hand in placing the workpiece.

According to the present invention, the hand apparatus of an industrial robot includes a first and a second hand mounted on a common frame. Two supporting arms are pivotally supported on the common frame at their respective ends by a pair of rotary shafts. The supporting arms are supported at their respective other ends at two different points on a base such that the two arms extend parallel to each other so as to constitute a parallel link. At least one of the supporting arms is pressed at its one end by an energizing spring.

Thus, in a normal state, the two supporting arms are held in a predetermined parallel link attitude by the energizing spring. But when either the first or the second hand receives a reaction force from setting a workpiece, this reaction force deforms the parallel link of the supporting arms against the pressing force of the energizing spring to thereby lessen the effect of the reaction force.

DESCRIPTION OF THE PREFERRED EMBODIMENTS

Figure 3:
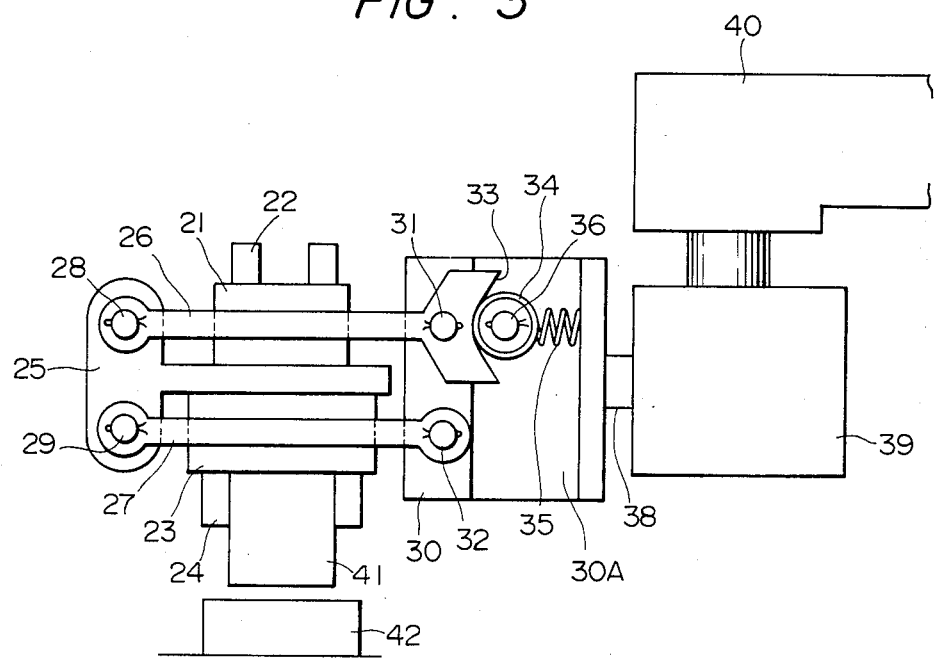
FIG. 3 is a front view illustrating an embodiment of the hand apparatus of the present invention.
Figure 4:
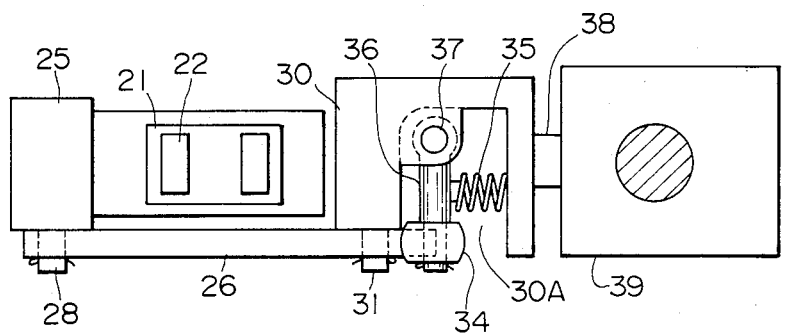
FIG. 4 is a plane view of FIG. 3.

FIGS. 3 and 4 are diagrams showing an arrangement of an embodiment of the hand apparatus according to the present invention. FIG. 3 is a front view and FIG. 4 is a plane view of FIG. 3.

In these drawings, a first hand 21 has two first gripping pawls 22. A second hand 23 with its two second gripping pawls 24 faces the opposite direction from that of the first hand 21. The first and second hands 21 and 23 are fixed on a T-shaped common frame in opposition to each other in a plane portion of the frame 25. A first supporting arm 26 is pivotally supported on one side arm of the frame 25 by a pin 28. Similarly to this, a second supporting arm 27 is pivotally supported on the other side arm of the frame 25 by a pin 29. A hand base 30 has attached pins 31 and 32, and the first and second supporting arms 26 and 27 are pivotally supported by the pins 31 and 32, respectively.

As shown in FIG. 4, in a recess portion 30A of the base 30, there is located a third supporting arm 36 pivotally supported by a pin 37. Also in the recess 30A, an energizing spring 35 presses the third supporting arm 36. One end of the spring 35 is fixed on a wall portion of the recess portion 30A, and the other end presses the movable third supporting arm 36. As shown in FIG. 3, an energizing roller 34 is located on a forward end portion of the third supporting arm 36 and is moved by the energizing spring 35 on the third supporting arm 36. The energizing roller 34 is arranged to normally be forced against a V-shaped pressure receiving surface 33 formed on the first supporting arm 26 at its end portion. A rotary shaft 38 is fixed to the base 30. A driving portion 39 operates (rotates) the rotary shaft 38 and thereby the base 30 and the hands 21 and 23. The driving portion 39 is connected to an arm 40 of an industrial robot.

Figure 5:
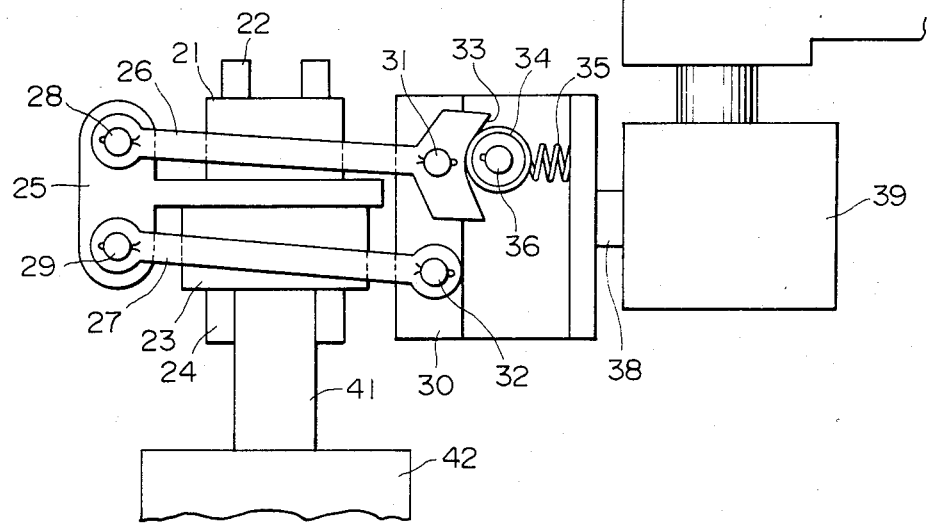
FIG. 5 is a front view showing deformation of the hand apparatus due to the reaction force generated when a workpiece is moved from the state of FIG. 3 to be set in position on the working table.

As shown in FIG. 5, the thus-arranged hand apparatus may be used so that the second gripping pawls 24 grip a workpiece 41 and set it in position on a working table 42. However, if the distance that the arm 40 is moved in the downward direction exceeds such a value as to make the workpiece 41 contact the working table 42, the workpiece 41 is forced against the working table 42 so that a reaction force, corresponding to the force applied by the workpiece 41, causes the workpiece 41 to force up the T-shaped frame 25 through the intermediary second gripping pawls 24 and the second hand 23. As a result, the first and second supporting arms 26 and 27 are rotated clockwise so as to rotate the energizing roller 34, which is forced against the V-shaped receiving surface 33 of the first supporting arm 26 at its end portion. Thus, the energizing spring 35 receives and accommodates the reaction force generated between the workpiece 41 and the working table 42, as transmitted through the energizing roller 34 and the third supporting arm 36, to thereby lessen the reaction force.

Figure 6:
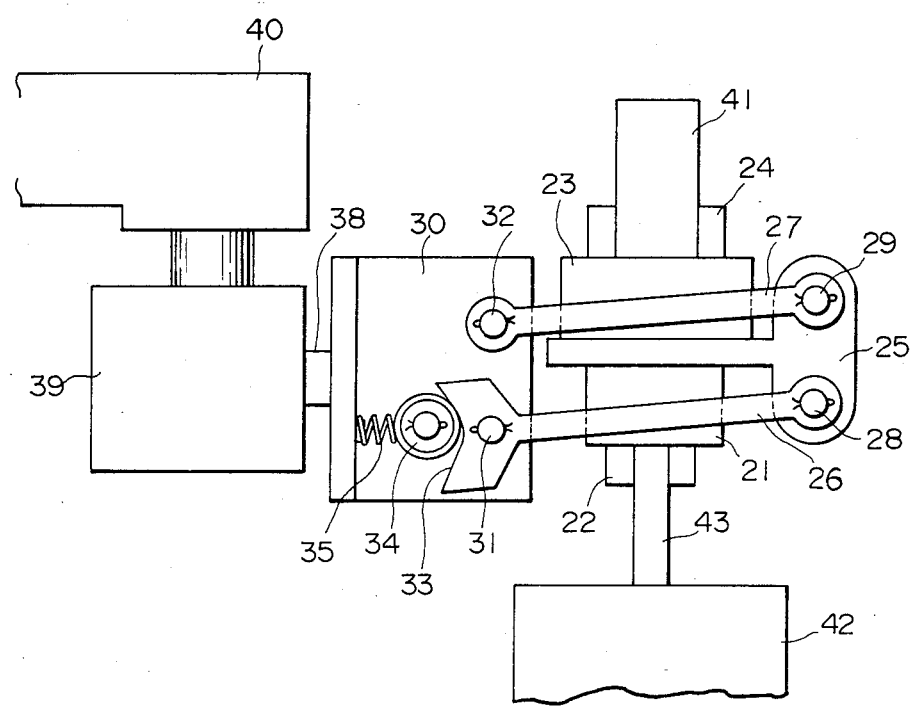
FIG. 6 is a front view showing a deformation of the hand apparatus (which has been rotated 180° from the orientation of FIG. 3) due to the reaction force generated when the hand apparatus grips a workpiece so as to set the workpiece in position on the working table, similarly to FIG. 5.

FIG. 6 shows a reversal of the orientation of the first and second supporting arms 26 and 27, the pressure receiving surface 33, the energizing spring 35, etc., from their orientation shown in a balanced condition FIG. 3 and in an unbalanced condition in FIG. 5. For this new orientation, the rotary shaft 38 has been rotated by 180° by the rotating operating portion 39 from the state shown in FIG. 3 so that a workpiece 43 is gripped by the first gripper 21 rather than the second gripper 23, is set in position on the working table 42, and a reaction force is generated between the working table 42 and the workpiece 43.

Figure 1:
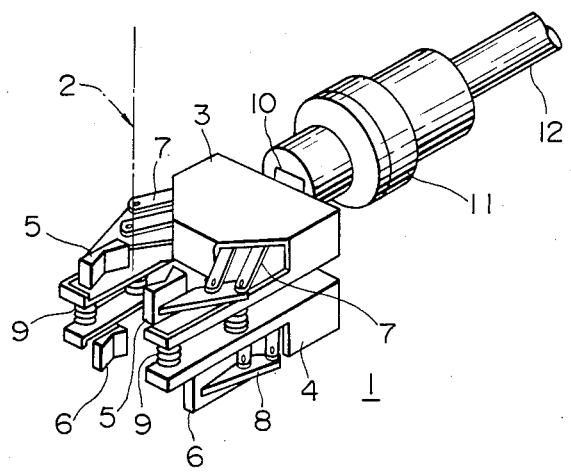
FIG. 1 is a perspective view showing an example of the conventional double-hand apparatus.
Figure 2:
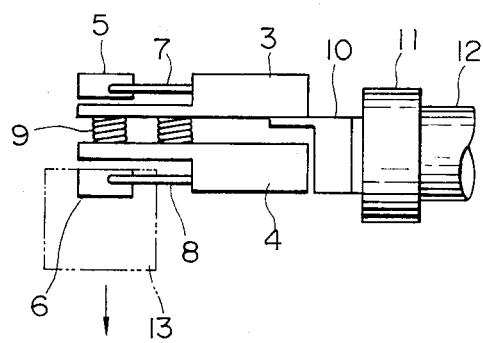
FIG. 2 is a side view of FIG. 1.

In this case, while the first and second supporting arms 26 and 27 move, the movements are limited within a certain plane, and therefore the setting of the workpieces 41 and 43, in either configuration, onto the working table 42 is never done incorrectly. That is, in the prior art arrangement shown in FIGS. 1 and 2, it is not always true that the springs 9 are compressed along the axis of the single-dot chain line 2, that is, they may be compressed at a slant relative to the single-dot chain line 2 so as to make it difficult to correctly position a workpiece. In the mechanism according to the present invention, on the other hand, such incorrect movements of the arms 26 and 27 never occur, and therefore it is possible in practical use to perform positioning of a workpiece with sufficient accuracy.

The energizing spring 35 must have a sufficiently great spring constant and the pressure receiving surface 33 must have a sufficiently concave shape to operate such that the reaction force generated between the workpiece 41 or 43 and the working table 42 is absorbed and reduced by the energizing spring 35 through the respective members such as the frame 25, the first and second supporting arms 26 and 27, etc. However, when there is no reaction force, the first and second supporting arms 26 and 27 are maintained at their attitudes in the form of horizontal cantilevers so as to sufficiently bear the respective weights of the T-shaped frame 25, the first and second supporting arms 26 and 27, the workpiece 41 or 43, etc.

Although the foregoing description applies to the case where the pressure applied by the energizing spring is effected only on the first supporting arm 26 in this embodiment, the arrangement may be modified such that a further energizing mechanism is additionally provided to also press the second supporting arm 27. In this case, the same effects as those in the above embodiment can of course be obtained.

With such an arrangement as described above, a workpiece can be moved by either hand, and it is possible to absorb reaction force generated between the work table and the workpiece by the interaction of the pressure receiving portion formed at one end of the supporting arm and the energizing spring. Moreover, it is possible to considerably simplify the mechanism for absorbing the reaction force as well as to correctly set a workpiece.

I claim:
1. A hand apparatus for an industrial robot, comprising:
   (a) first and second gripper means for gripping a workpiece;
   (b) a frame supporting said first and second gripper means;
   (c) first and second supporting arms pivotally supported at respective first ends on said frame, said arms being arrangeable in parallel with respect to each other in a normal state so as to constitute a parallel link mechanism in cooperation with said frame;
   (d) a base supporting respective second ends of said first and second supporting arms;
   (e) elastic means provided on said base to exert elastic force on at least one of said first and second supporting arms, wherein said at least one of said first and second supporting arms on which said elastic force is exerted includes a pressure receiving surface for receiving said elastic force of said elastic means, said pressure receiving surface being formed on said at least one of said first and second supporting arms in the vicinity of a portion thereof supported on said base, said pressure receiving surface including a concave surface opening outwardly in an axial direction of said at least one of said first and second supporting arms; and
   (f) said elastic means being arranged to maintain said parallel link mechanism in a predetermined attitude in said normal state while allowing said parallel link mechanism to change said attitude when external force is exerted onto said first and second gripper means.

2. The hand apparatus as recited in claim 1, further comprising a roller arranged to engage with said concave surface, and wherein said elastic means exerts said elastic force on said concave surface through said roller.

3. The hand apparatus as recited in claim 2, wherein said roller is rotatably supported on said base and rotatably mounted on a portion of a member arranged to be movable such that said portion thereof can approach and depart from said concave surface, said elastic means exerting said elastic force on said concave surface through said member and said roller.

4. The hand apparatus as recited in claim 3, wherein said concave surface is formed on said second end of said at least one arm.

5. The hand apparatus as recited in claim 3, wherein said member is a rod member having a forward end on which said roller is rotatably mounted, said forward end being movable in said axial direction of said at least one arm.

6. The hand apparatus as recited in claim 5, wherein one end of said elastic means engages said rod member at an intermediate portion of said rod member so that said elastic force is normally exerted on said rod member so as to cause said forward end to move toward said concave surface.

7. The hand apparatus as recited claim 5, wherein said base includes a recess portion in the vicinity of said second end of said at least one arm, said elastic means and said rod member being disposed within said recess portion.

8. The hand apparatus as in claim 1, wherein said frame has a plane portion extending substantially in the same direction as a longitudinal direction of said first and second supporting arms, said first and second gripper means being mounted on opposite surfaces of said plane portion respectively.

9. The hand apparatus as recited in claim 8, wherein said frame has a supporting portion formed at an end portion of said plane portion and extending in the direction perpendicular to said plane portion, and further comprising a first and second pin for respectively supporting said first and second supporting arms at said respective one ends thereof provided on said supporting portion.

10. The hand apparatus as recited in claim 8, wherein said plane portion is disposed at an intermediate side portion between said first and second supporting arms.

11. The hand apparatus as recited in claim 1, further comprising a rotary shaft connected to said base for rotationally driving said base to thereby reverse positions of said first and second gripper means so as to selectively and alternatively cause said first and second gripper means to operate.

12. The hand apparatus as recited in claim 11, wherein said elastic means is elastically deformable in order to absorb said external force upon exertion of external force onto any one of said first and second gripper means when said first and second gripper means are reversed.

13. The hand apparatus as recited in claim 11, wherein said base, said first and second supporting arms, said frame, and said first and second gripper means are integrally caused to perform a reversible operation by said rotational driving by said rotary shaft.

* * * * *